United States Patent Office 3,679,630
Patented July 25, 1972

3,679,630
CURABLE COMPOSITIONS COMPRISING A POLY-EPOXIDE, A POLYISOCYANATO SILANE AND A CATALYST THEREFOR
Frederick P. Corson, Midland, Mich., assignor to The Dow Chemical Company, Midland, Mich.
No Drawing. Filed Dec. 11, 1970, Ser. No. 97,326
Int. Cl. C08g 30/14
U.S. Cl. 260—47 EN                      9 Claims

ABSTRACT OF THE DISCLOSURE

Curable epoxide compositions comprise (a) a polyepoxide such as the diglycidyl ether of bisphenol A, (b) a polyisocyanatosilane such as diisocyanatodiphenylsilane and (c) a curing catalyst therefor such as a phosphonium compound, a quaternary ammonium halide, an alkali metal halide or cyanate, an aliphatic tertiary amine, or a tertiary phosphine.

---

This invention relates to a process for curing epoxy resins and more particularly concerns a process for curing epoxy resins with polyisocyanatosilanes.

Epoxy resins have been reacted with diisocyanates to prepare oxazolidinone containing epoxy resin polymers such as those taught in U.S. 3,020,262. The polymers, however, exhibit poor resistance to inorganic acids such as sulfuric acid and alkalis such as sodium hydroxide.

It has now been unexpectedly discovered that a thermosettable composition comprising an epoxy resin and a polyisocyanatosilane will remain storage stable until admixed with a catalytic quantity of a quaternary ammonium or phosphonium compound and subsequently heated.

It has further been unexpectedly discovered that the thermoset product resulting from heating a composition comprising an epoxy resin, a polyisocyanatosilane and a quaternary ammonium or phosphonium compound has better resistance to inorganic acids and alkalis than thermoset epoxy compositions comprising an epoxy resin and a polyisocyanate and a quaternary ammonium halide.

Epoxy resins which are employed in the compositions of the present invention include the polyglycidyl ethers of polyhydric compounds such as, for example, polyhydric phenols, bisphenols, polyoxyalkylene glycols, polyhydric aliphatic compounds such as glycerine, neopentyl glycol, halogenated neopentyl glycols and the like. Suitable such polyglycidyl ether compounds may be represented by the following general formulae:

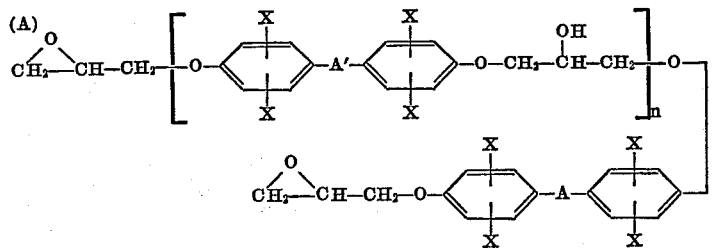

wherein A' is selected from the group consisting of an alkylene or alkylidine group having from 1 to 4 carbon atoms, —S—, —S—S—,

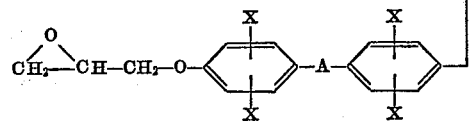

—O—, X is hydrogen or a halogen and n is an integer having an average value of from about 0 to about 10;

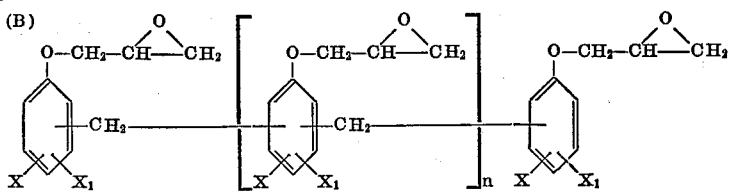

wherein X and X₁ are independently selected from the group consisting of hydrogen, an alkyl group having from about 1 to about 4 carbon atoms, and a halogen and n is an integer having an average value of from about 0.1 to about 4;

(C)

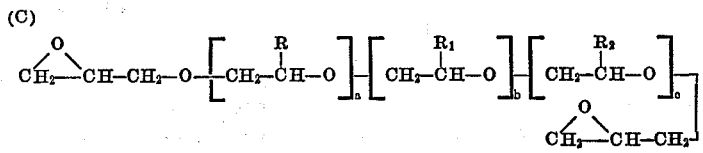

wherein R, R₁, and R₂ are independently hydrogen, an alkyl or haloalkyl group having from about 1 to about 4 carbon atoms, and a, b, and c are integers, the sum of which is an integer having an average value of from about 3 to about 40;

(D)

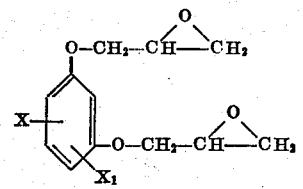

wherein X and X₁ are as indicated in Formula B above.

(E)

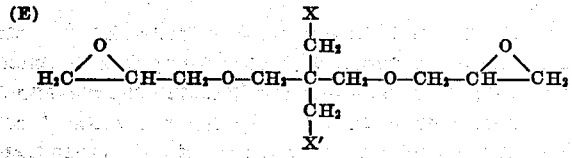

wherein X and X' are independently selected from hydrogen, chlorine and bromine.

(F)

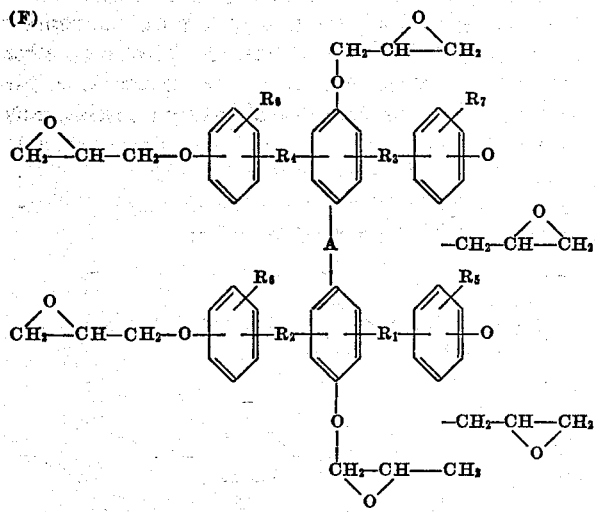

wherein A is a divalent radical selected from the group consisting of alkylidene, cycloalkylidene,

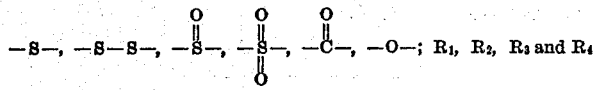

independently alkylidene groups and R₅, R₆, R₇ and R₈ are independently hydrogen, halogen or alkyl groups having from 1 to about 4 carbon atoms.

(G)

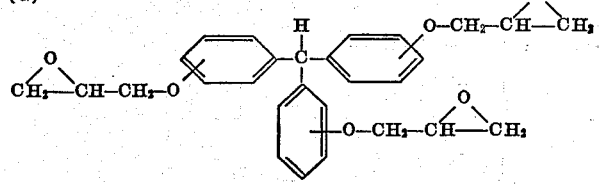

Polyisocyanatosilanes which are employed in the composition of the present invention include the di-tri- and tetraisocyanatosilanes which may be represented by the general formula

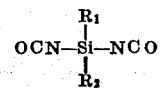

wherein R₁ and R₂ are independently selected from an alkyl group having from about 1 to about 10 carbon atoms, alkaryl, aralkyl and aryl groups, and the —NCO group.

Suitable such polyisocyanatosilanes include diisocyanatodiphenylsilane, diisocyanatodimethylsilane, diisocyanatodiethylsilane, diisocyanatodipropylsilane, triisocyanatomethylsilane, tetraisocyanatosilane, mixtures thereof and the like.

The catalysts which are employed to promote the reaction between the polyepoxide and the polyisocyanatosilane include the alkali metal halides and cyanates such as for example, lithium iodide, potassium iodide, lithium bromide, potassium bromide, lithium chloride, lithium fluoride, potassium cyanate and the like; quaternary ammonium halides and cyanates, quaternary phosphonium compounds, mixtures of any of the above and the like.

The quarternary ammonium halides and cyanates may be represented by the general formula

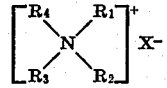

wherein R₁, R₂, R₃ and R₄ are independently selected from hydrogen and hydrocarbon radicals having from about 1 to about 16 carbon atoms, said hydrocarbon radicals being selected from alkyl, cycloalkyl, aryl, alkaryl, and aralkyl and X is selected from the group consisting of fluoride, chloride, bromide, iodide, and cyanate. Suitable such quaternary ammonium halides and cyanates include, for example, tetraethylammonihm iodide, triethylpropyl ammonium iodide, tetrabutyl ammonium iodide, the corresponding chlorides, bromides, fluorides, cyanates and the like.

The phosphonium catalysts employed in the present invention may be represented by the general formula

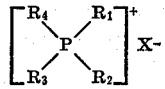

wherein R₁, R₂, and R₃ are independently selected from the group consisting of aliphatic hydrocarbon radicals or substituted aliphatic hydrocarbon radicals having from about 1 to about 25 carbon atoms, R₄ is selected from the same group as R₁, R₂ and R₃ and an aryl or substituted aryl group and wherein X is the anion portion of an inorganic or lower aliphatic carboxylic acid.

Suitable phosphonium catalysts include, for example, methyl tributyl, phosphonium iodide, ethyltributyl phosphonium iodide, propyl tributyl phosphonium iodide, tetrabutyl phosphonium bromide, tetrabutyl phosphonium iodide, tetrabutyl phosphonium chloride, tetrabutyl phosphonium hydroxide, tetrabutyl phosphonium acetate acetic acid complex, tetramethyl phosphonium bromide, tetramethyl phosphonium iodide, tetramethyl phosphonium chloride, tetramethyl phosphonium hydroxide, ethyltricyclohexylphosphonium bromide, phenyltributylphosphonium iodide, methyltrioctylphosphonium dimethylphosphate, tetra(3,3-dimethylbutyl)phosphonium chloride.

Other suitable catalysts include the phosphonium salts of an acid, acid ester or ester of an element selected from the group consisting of carbon, nitrogen, phosphorus, sulfur, silicon and boron which may represented by the general formula

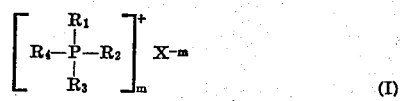

(I)

wherein R₁, R₂ and R₃ are independently selected from the group consisting of hydrogen, aliphatic hydrocarbon radicals containing from about 1 to about 20 carbon atoms, and radicals represented by the formula —R₅—Y wherein R₅ is an aliphatic hydrocarbon radical having from about 1 to about 20 carbon atoms, and Y is a member selected from the group consisting of Cl, Br, I, NO₂, H and OH, R₄ is selected from the same group as R₁, R₂ and R₃ and aromatic hydrocarbon radicals and alkyl substituted aromatic hydrocarbon radicals and wherein X is the anion portion of an acid, ester or acid ester of an element selected from carbon, nitrogen, phosphorus, sulfur, silicon and boron and wherein $m$ is the valence of the anion X.

One group of catalysts employed in this invention are the phosphonium salts of an acid of the element nitrogen which are represented by the general formula

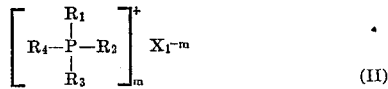
(II)

wherein $R_1$, $R_2$, $R_3$ and $R_4$ are as defined in Formula I, $m$ is the valence of the anion $X_1$ and has a value of 1 and wherein $X_1$ is selected from the group consisting of

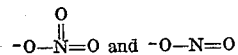

Suitable such phosphonium salts of a nitrogen-containing acid catalyst include, for example, tetrabutyl phosphonium nitrate, tetramethyl phosphonium nitrite and the like.

Another group of catalysts employed in the present invention are the phosphonium salts of an acid, ester, or acid ester of the element phosphorous which are represented by the general formula

(III)

wherein $R_1$, $R_2$, $R_3$ and $R_4$ are as defined in Formula I above wherein $m$ is the valence of the anion $X_2$ and has a value from 1 to 3 and wherein $X_2$ may be represented by the general formulae

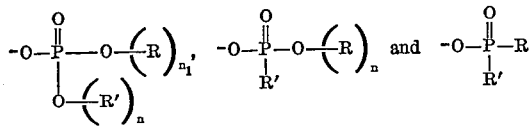

wherein each R and R' are independently selected from the same group as $R_1$, $R_2$, and $R_3$ and $R_4$ above and wherein $n$ and $n_1$ independently have values equal to zero or 1

Suitable such phosphonium salts of a phosphorus containing acid, ester or acid ester catalyst include, for example, tetrabutyl phosphonium diethylphosphate, di(tetrabutylphosphonium)ethylphosphate, tri(tetramethylphosphonium) phosphate, tetramethylphosphonium dimethyl phosphate, methyltrioctylphosphonium dimethylphosphate, methyltributylphosphonium dimethylphosphonate, ethyltributylphosphonium diphenylphosphinate and the like.

Another group of catalysts employed in the present invention are the phosphonium salts of an acid, ester or acid ester of the element sulfur which are represented by the formula

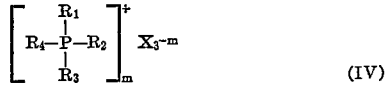
(IV)

wherein $R_1$, $R_2$, $R_3$ and $R_4$ are as defined in Formula I, wherein $m$ is the valence of the anion $X_3$ has a value from 1 to 2, and wherein $X_3$ is selected from the group represented by the general formulae

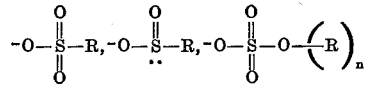

wherein R is independently selected from the same group as $R_1$, $R_2$, $R_3$ and $R_4$ as defined in Formula I and wherein $n$ has a value of zero or 1.

Suitable such phosphonium salts of a sulfur-containing acid, ester or acid ester catalysts include, for example, tetramethylphosphonium ethylsulfate, di(tetrabutylphosphonium) sulfate and the like.

Another group of catalysts employed in the present invention are the phosphonium salts of an acid, ester or acid ester of the element silicon which are represented by the general formula

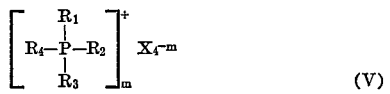
(V)

wherein $R_1$, $R_2$, $R_3$ and $R_4$ are as defined in Formula I, wherein $m$ is the valence of the anion $X_4$ and has a value of from 1–4, and wherein $X_4$ is represented by the general formula

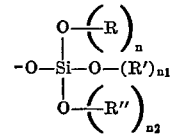

wherein R, R' and R'' are independently selected from the same group as $R_1$, $R_2$, $R_3$ and $R_4$ defined as in Formula I and wherein $n$, $n_1$ and $n_2$, independently, have values of zero or 1.

Suitable such phosphonium salts of a silicon containing acid, ester or acid ester catalyst include, for example, tetramethylphosphonium triethylsilicate, di(tetrabutylphosphonium)diethylsilicate, tri(tetramethylphosphonium)ethylsilicate, tetra(tetrabutylphosphonium) silicate and the like.

Another group of catalysts employed in the present invention are the phosphonium salts of an acid, ester or acid ester of the element boron which are represented by the general formula (VI)

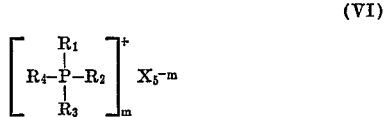

wherein $R_1$, $R_2$, $R_3$ and $R_4$ are as degned in Formula I, wherein $m$ is the valence of the anion $X_5$ and has a value of from 1 to 3, and wherein $X_5$ is represented by the general formula

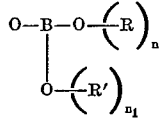

wherein R and R' are independently selected from the same group as $R_1$, $R_2$, $R_3$ and $R_4$ defined in Formula I and wherein $n$ and $n_1$ independently have values of zero or 1.

Suitable such phosphonium salts of a boron-containing acid, ester or acid ester catalyst include, for example, tetrabutylphosphonium diethylborate, tetramethylphosphonium dimethylborate, di(tetramethylphosphonium) ethylborate, tri(tetrabutylphosphonium)borate, tetramethylphosphonium dipropylborate and the like.

Another group of catalysts employed in the present invention are the phosphonium salts of an acid, ester or acid ester of the element carbon which are represented by the formula

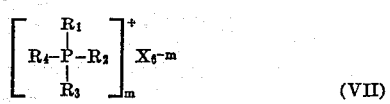
(VII)

wherein $R_1$, $R_2$, $R_3$ and $R_4$ are as defined in Formula I, m is the valence of the anion $X_6$ and has a value of 1–2 and $X_6$ is represented by the formula

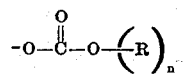

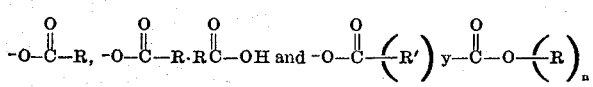

wherein R and R' are independently selected from the same group as $R_1$, $R_2$, $R_3$ and $R_4$ as defined in Formula I and R can also be an alkenyl group having from about 1 to about 20 carbon atoms, and R' can also be an alkenylene group having from about 1 to about 20 carbon atoms and $n$ has a value equal to zero or 1 and wherein $y$ has a value of zero or 1.

Suitable such phosphonium salts of carbon-containing acid, ester or acid ester catalysts include, for example, tetramethylphosphonium acetate, di(tetrabutylphosphonium) carbonate, triethylphenylphosphonium ethylcarbonate, tributylphenylphosphonium ethyloxalate, di(tetramethylphosphonium) oxalate and the like.

In some instances, the phosphonium salts of a carboxylic acid employed as catalysts herein may contain some acid-salt complex without significantly adversely affecting the catalytic activity of the catalyst. In these instances, the catalyst complex may be represented by the general formula

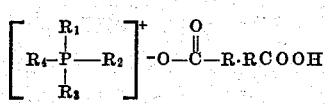

wherein R, $R_1$, $R_2$, $R_3$ and $R_4$ are as defined in Formula I.

The phosphonium catalysts employed in the present invention are commercially available compounds and general procedures and references for their preparation are given in Organo Phosphorus Compounds, by G. M. Kosolapoff, John Wiley & Sons, 1958.

Another class of catalysts which may be employed in the process of the present invention are the internal phosphonium salts (phosphobetaines) represented by the general formula

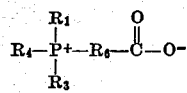

or when $R_6$ has about 3 carbon atoms by the formula

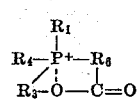

wherein $R_1$, $R_3$ and $R_4$ are as previously defined, and $R_6$ is an alkylene group having from about 2 to about 20 carbon atoms.

The internal phosphonium salts known as phosphobetaines may be prepared by the procedure outlined in the Journal of Organic Chemistry, volume 27, pp. 3403–3408, published in 1962.

Suitable such phosphobetaines include, for example, trimethylpropiophosphobetaine, tributylbutyrophosphobetaine, mixtures thereof and the like.

Another class of catalysts which may be employed in the process of the present invention are the tertiary phosphines represented by the general formula

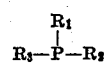

wherein $R_1$, $R_2$, and $R_3$ are independently selected from the group consisting of aliphatic hydrocarbon radicals having from 1 to about 25 carbon atoms, aromatic hydrocarbon radicals, and alkyl substituted aromatic hydrocarbon radicals.

Another group of catalysts which may be employed in the compositions of the present invention are the alkyl tertiary amines wherein the alkyl substituents contain from about 1 to about 10 carbon atoms such as, for example, trimethylamine, tributylamine, trioctylamine, triethylamine, mixtures thereof and the like.

The polyisocyanatosilanes and polyepoxides comprising the composition of the present invention are employed in a NCO:epoxide ratio of from about 0.6:1 to about 1.2:1 and preferably 1:1. The catalyst is employed in quantities of from about 0.001 to about 0.1 part and preferably from about 0.005 part to about 0.02 part by weight based upon the combined weight of the polyisocyanatosilane and the polyepoxide.

The components of the present invention, i.e. the polyepoxide, the polyisocyanatosilane and the catalyst, may be mixed together and heated to a temperature of from about 50° to about 200° C. and preferably from about 120° to about 160° C. for from about 1 to about 48 hours to effect the cure of the composition. When this method is employed, solid particulate particles are observed throughout the resin. This is not particularly disadvantageous, especially in compositions containing fillers wherein such particulate matter would not be observed. However, when diisocyanatosilanes are employed, the particulate particles can be avoided by heating a mixture of the polyepoxide and the polyisocyanatosilane in the absence of the catalyst, at a temperature of from about 50° to about 180° C. for from about 1 to about 5 hours and removing the solid particulate matter by filtration or centrifugation or the like. Then when it is desired to effect the cure, the catalyst is added and the resultant mixture heated as previously described to effect the cure.

The compositions of the present invention may contain any of the well known additives such as, for example, diluents, fillers, pigments, extenders, flexibilizers and the like.

The compositions of the present invention may be employed in coatings, castings, adhesives, reinforced laminates and the like.

The following examples are illustrative of the present invention, but are not to be construed as to limiting the scope thereof in any manner.

EXAMPLE 1

A mixture was prepared from 5.3 grams (0.04 NCO equivalents) of diisocyantodiphenylsilane having an NCO equivalent weight of 133, 7.0 grams (0.04 epoxide equivalent) of the diglycidyl ether of p,p'-isopropylidinediphenol having an epoxide equivalent weight of 175 and 0.12 gram of tetrabutylammonium iodide. The mixture was then placed in a 120° C. oven for 24 hours. The resultant product was a hard glossy resin which contained solid, white particulate matter.

EXAMPLE 2

A mixture of 5.3 grams (0.04 NCO equivalents) of diisocyanatodiphenylsilane having an NCO equivalent weight of 133 and 7.0 grams (0.04 epoxide equivalents) of the diglycidylether of p,p'-isopropylidinediphenol having an epoxide equivalent weight of 175 was heated at 120° C. for 1 hour. After removing a white, solid particulate material by filtration, 0.12 gram of tetrabutylammonium iodide was added and the mixture cured at 120° C. for 24 hours in a 2" diameter aluminum pan. The cured product was a hard, glossy, clear resin free of bubbles and particulate matter. The resistance of this product to sulfuric acid and sodium hydroxide was then observed.

EXAMPLE 3

(A) A mixture of 10.2 grams (0.03 mole) of the diglycidyl ether of p,p'-isopropylidinediphenol having an epoxide equivalent weight of 175 and 13.2 grams (0.05 mole) of diisocyanatodiphenylsilane having an NCO equivalent weight of 133 was heated at 145° C. for 1 hour and filtered under a nitrogen atmosphere to remove the solid particulate matter. The mixture was then admixed with 0.2 grams of tetrabutylammonium iodide and poured into 2" diameter aluminum pans and cured at 145° C. for 48 hours. The clear, hard, glossy product was then tested for its resistance to sulfuric acid and sodium hydroxide.

(B) For comparative purposes, a cured product was prepared by mixing together 20.0 grams (0.06 mole) of the diglycidyl ether of p,p'-isopropylidine diphenol having an epoxide equivalent weight of 175, 17.4 grams (0.1 mole) of toluene-diisocyanate having an NCO equivalent weight of 87 and 0.4 grams of tetrabutylammonium iodide. The mixture was poured into 2" diameter aluminum pans and cured at 145° C. for 48 hours. The product was then tested for its resistance to sulfuric acid and sodium hydroxide.

The products from Examples 2, 3A and 3B were immersed in 30% by weight aqueous sulfuric acid and 50% by weight aqueous sodium hydroxide. The percent weight changes of the specimen were obtained after 7, 14 and 28 days. The results are given in the following table.

TABLE

| Example No. | Isocyanate employed | Ratio of equivalents of NCO to equivalent of epoxide | Percent weight change | | | | | |
|---|---|---|---|---|---|---|---|---|
| | | | 30% H$_2$SO$_4$ | | | 50% NaOH | | |
| | | | 7 days | 14 days | 28 days | 7 days | 14 days | 28 days |
| 2 | Diisocyanatodiphenylsilane | 1.0:1 | +0.37 | +0.59 | +0.89 | +0.16 | +0.36 | +0.56 |
| 3A | do | 0.6:1 | +1.00 | +1.60 | +0.95 | +0.40 | +0.39 | [1] −1.0 |
| 3B (control) | Toluenediisocyanate | 0.6:1 | +1.30 | +3.00 | +4.82 | +0.25 | +0.16 | [1] −0.21 |

[1] Samples were beginning to disintegrate.

The above table clearly shows the superior resistance of the cured compositions of the present invention using polyisocyanatosilanes over those compositions employing aromatic diisocyanates.

I claim:

1. A composition, curable upon heating, to a thermoset product, said composition consisting essentially of (a) a polyisocyanatosilane, (b) a poylepoxide of the glycidyl ether type and (c) a catalyst selected from the group consisting of an alkyl tertiary amine having from about 1 to about 10 carbon atoms, a tertiary phosphine represented by the formula

wherein $R_1$, $R_2$ and $R_3$ are independently selected from aliphatic and aromatic hydrocarbon groups having from 1 to about 25 carbon atoms, a quaternary ammonium halide or cyanate, a phosphonium compound represented by the formula

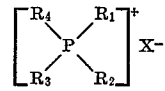

wherein $R_1$, $R_2$, and $R_3$ are independently selected from the group consisting of aliphatic hydrocarbon radicals or substituted aliphatic hydrocarbon radicals having from about 1 to about 25 carbon atoms, $R_4$ is selected from the same group as $R_1$, $R_2$ and $R_3$ and an aryl or substituted aryl group and wherein X is the anion portion of an inorganic or lower aliphatic carboxylic acid and an alkali metal halide or cyanate; wherein the NCO:epoxide ratio is about 1:1 and the catalyst (c) is in the range of from about 0.001 to about 0.10 parts by weight based upon the combined weights of (a) and (b).

2. The composition of claim 1 wherein component (c) is employed in the range of from about 0.005 to about 0.02.

3. The composition of claim 2 wherein the polyisocyanatosilane is a diisocyanatosilane.

4. The composition of claim 3 wherein the diisocyanatosilane is diisocyanatodiphenylsilane.

5. The composition of claim 2 wherein the polyepoxide is a diglycidylether of a diphenol.

6. The composition of claim 2 wherein the catalyst is a quaternary ammonium halide.

7. The composition of claim 6 wherein the quaternary ammonium halide is tetrabutylammonium iodide.

8. A thermoset product resulting from heating at a temperature of from about 50° C. to about 200° C. a composition consisting essentially of (a) a polyisocyanatosilane, (b) a polyepoxide of the glycidyl ether type and (c) a catalyst selected from the group consisting of an alkyl tertiary amine having from about 1 to about 10 carbon atoms, a tertiary phosphine represented by the formula

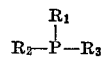

wherein $R_1$, $R_2$ and $R_3$ are independently selected from aliphatic and aromatic hydrocarbon groups having from 1 to about 25 carbon atoms, a quaternary ammonium halide or cyanate, a phosphonium compound represented by the formula

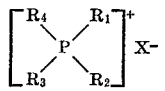

wherein $R_1$, $R_2$, and $R_3$ are independently selected from the group consisting of aliphatic hydrocarbon radicals or substituted aliphatic hydrocarbon radicals having from about 1 to about 25 carbon atoms, $R_4$ is selected from the same group as $R_1$, $R_2$ and $R_3$ and an aryl or substituted aryl group and wherein X is the anion portion of an inorganic or lower aliphatic carboxylic acid and an alkali metal halide or cyanate; wherein the NCO epoxide ratio is from about 0.6:1 to about 1.2:1 and the catalyst is in the range of from about 0.001 to about 0.10 parts by weight based upon the combined weights of (a) and (b).

9. The thermoset product of claim 8 wherein said composition is heated at a temperature between about 120° C. and about 160° C. and component (C) is employed in quantities of from about 0.005 to about 0.02.

References Cited

UNITED STATES PATENTS 3,334,110  8/1967  Schramm _____ 260—47

OTHER REFERENCES

Chem. Abst., vol. 60, 1964, p. 552 z.

WILLIAM H. SHORT, Primary Examiner

T. E. PERTILLA, Assistant Examiner

U.S. Cl. X.R.

117—161 ZB; 161—184; 260—2 EN, 59, 77.5 NC